(12) United States Patent
Wu

(10) Patent No.: US 9,529,204 B2
(45) Date of Patent: Dec. 27, 2016

(54) DISPLAY DEVICE SWITCHABLE BETWEEN TWO-DIMENSIONAL DISPLAY MODE AND THREE-DIMENSIONAL DISPLAY MODE

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 472 days.

(21) Appl. No.: 14/353,506

(22) PCT Filed: Nov. 15, 2013

(86) PCT No.: PCT/CN2013/087207
§ 371 (c)(1),
(2) Date: Apr. 23, 2014

(87) PCT Pub. No.: WO2015/018139
PCT Pub. Date: Feb. 12, 2015

(65) Prior Publication Data
US 2016/0274370 A1    Sep. 22, 2016

(30) Foreign Application Priority Data

Aug. 9, 2013 (CN) .......................... 2013 1 0347176

(51) Int. Cl.
*G02B 27/26* (2006.01)
*G02B 27/22* (2006.01)
(Continued)

(52) U.S. Cl.
CPC ........... *G02B 27/2214* (2013.01); *G02B 27/26* (2013.01); *H04N 13/0409* (2013.01);
(Continued)

(58) Field of Classification Search
CPC combination set(s) only.
See application file for complete search history.

(56) References Cited

U.S. PATENT DOCUMENTS

2005/0225502 A1* 10/2005 Nam ................... H04N 13/0409
345/55
2006/0146208 A1* 7/2006 Kim ..................... G02B 27/2214
349/15
(Continued)

*Primary Examiner* — Bumsuk Won
*Assistant Examiner* — Balram Parbadia
(74) *Attorney, Agent, or Firm* — Brooks Kushman P.C.

(57) ABSTRACT

This disclosure discloses a display device switchable between a 2D display mode and a 3D display mode, wherein a parallax barrier is disposed between a first polarizer and a backlight to implement glassless-type 3D display. A first transparent electrode, an electroluminescent layer, and a second transparent electrode are sequentially disposed between the first polarizer and the parallax barrier, the first transparent electrode and/or the second transparent electrode at least having a pattern corresponding to opaque stripes of a slit light source. Switchover between the 2D display mode and the 3D display mode may be implemented by controlling whether or not to apply a voltage to the electroluminescent layer. The switchover between a 2D display mode and a 3D display mode may be implemented only by adding an electroluminescent layer, and the thickness of the display device is not increased.

20 Claims, 3 Drawing Sheets

(51) Int. Cl.
*H04N 13/04* (2006.01)
*H05B 33/28* (2006.01)
(52) U.S. Cl.
CPC ..... *H04N 13/0411* (2013.01); *H04N 13/0452* (2013.01); *H04N 13/0454* (2013.01); *H05B 33/28* (2013.01); *G02F 2201/44* (2013.01)

(56) References Cited

U.S. PATENT DOCUMENTS

| | | | | |
|---|---|---|---|---|
| 2006/0215262 | A1* | 9/2006 | Kim | G02B 27/2214 359/465 |
| 2007/0152998 | A1* | 7/2007 | Ahn | H04N 13/0409 345/419 |
| 2009/0190095 | A1* | 7/2009 | Ellinger | G02B 27/2207 353/7 |
| 2010/0060822 | A1* | 3/2010 | Sun | C09K 11/7734 349/71 |
| 2011/0050870 | A1* | 3/2011 | Hanari | H04N 13/0438 348/56 |
| 2012/0229431 | A1* | 9/2012 | Hiroki | G09G 3/003 345/204 |
| 2012/0274542 | A1* | 11/2012 | Yamazaki | H04N 13/0422 345/32 |
| 2012/0287504 | A1* | 11/2012 | Jang | G02B 27/26 359/463 |
| 2013/0021561 | A1* | 1/2013 | Ahn | G02F 1/133512 349/77 |
| 2013/0293793 | A1* | 11/2013 | Lu | G02B 27/2214 349/15 |

* cited by examiner

-Prior Art-

-Prior Art-

DISPLAY DEVICE SWITCHABLE BETWEEN TWO-DIMENSIONAL DISPLAY MODE AND THREE-DIMENSIONAL DISPLAY MODE

CROSS-REFERENCE TO RELATED APPLICATIONS

This application is the U.S. national phase of PCT Application No. PCT/CN2013/087207 filed on Nov. 15, 2013, which claims priority to Chinese Patent Application No. 201310347176.X filed on Aug. 9, 2013, the disclosures of which are incorporated in their entirety by reference herein.

TECHNICAL FIELD

This disclosure relates to the field of display technologies, and in particular, to a display device switchable between a two-dimensional display (2D) mode and a three-dimensional display (3D) mode and a control method thereof, and an electronic product.

BACKGROUND

In conventional three-dimensional display technologies, 3D display is generally implemented by disposing a parallax barrier 20' (i.e., a slit light grating) on a side of the interface displayed by a display panel 10'. The principles of implementation of 3D display are as illustrated in FIG. 1. The parallax barrier 20' has a slit grating structure, and images of pixels on the display panel 10' are transmitted to observation points via a slit on the parallax barrier 20'. As seen from FIG. 1, a left eye 12' and a right eye 11' at the observation points are capable of observing different pixels on the display panel 10', such that the observer is capable of observing two different images at the observation points, thereby implementing glassless-type 3D display.

As the market requires, there already appeared a display device switchable between a 2D display mode and a 3D display mode. To implement a switchover between the 2D display mode and the 3D display mode, liquid crystal shutter slit grating is the most commonly employed technique. As illustrated in FIG. 2, the liquid crystal shutter slit grating is a Twist Nematic (TN) mode liquid crystal panel, which comprises from top to bottom a first substrate 100' and a second substrate 200' aligned therebetween, and a liquid crystal layer 60' sandwiched between the first substrate 100' and the second substrate 200'. A first pattern-like transparent electrode 40' is formed on the surface of a side, close to the liquid crystal layer 60', of the first substrate 100; and a first liquid crystal alignment film 42' is further formed on the first transparent electrode 40'. Here the first transparent electrode 40' is formed by a plurality of parallelly disposed electrode bars, and a distance between two neighboring electrode bars satisfies the condition of the slit grating for use in glassless-type 3D display. An entire second transparent electrode 41' is formed on the surface of a side, close to the liquid crystal layer 60', of the second substrate 200; and a second liquid crystal alignment film 43' is further formed on the second transparent electrode 41'. And the second liquid crystal alignment film 43' has the same alignment direction as the first liquid crystal alignment film 42'. The first transparent electrode 40' and the second transparent electrode 41' are respectively electrically coupled to two terminals of a power supply 50', and a switch 71' is arranged to control applying a voltage to the first transparent electrode 40' and the second transparent electrode 41'. The specific working principles are as follows: During 2D display, the switch 70' is opened, such that no voltage is applied to the first transparent electrode 40' and the second transparent electrode 41', liquid crystal molecules of the liquid crystal layer 60' are subject to no deflection, and the light still serves as a surface light source after passing through the liquid crystal shutter slit grating, thereby implementing 2D display. And during 3D display, the switch 70' is closed, such that a voltage is applied to the first transparent electrode 40' and the second transparent electrode 41', liquid crystal molecules of the liquid crystal layer 60' corresponding to electrode bars of the first transparent electrode 40' in terms of position are subject to deflection, and light fails to pass though but only passes through the slits between the electrode bars, thereby implementing 3D display.

However, the liquid crystal shutter slit grating is thick, and the manufacture cost is high, which is adverse in light-weighted and thin product as well as promotion of the display device switchable between the 2D display mode and the 3D display mode. This disclosure is directed to solving the problem as how to implement a light-weighted and thin display device switchable between the 2D display mode and the 3D display mode, and to reduce the manufacture cost.

SUMMARY

I. Technical Problem to be Solved

This disclosure provides a display device switchable between a 2D display mode and a 3D display mode, to solve the problem that a conventional display device switchable between a 2D display mode and a 3D display mode is thick and the manufacture cost is high.

II. Technical Solutions

To solve the above technical problem, this disclosure provides a display device switchable between a 2D display mode and a 3D display mode, comprising a display panel and a backlight, wherein the display panel comprises a first polarizer disposed on a side, close to the backlight, of the display panel; and a second polarizer disposed on a side, away from the backlight, of the display panel; wherein a parallax barrier is disposed between the first polarizer and the backlight;

wherein a first transparent electrode, an electroluminescent layer, and a second transparent electrode are sequentially disposed between the first polarizer and the parallax barrier, the first transparent electrode and/or the second transparent electrode at least having a pattern corresponding to opaque stripes of the parallax barrier; and wherein in the 2D display mode, the electroluminescent layer corresponding to the pattern stays in a luminescent state; and in the 3D display mode, the electroluminescent layer corresponding to the pattern stays in a light-transmitting state.

Further, the first transparent electrode, the electroluminescent layer, the second transparent electrode, and the parallax barrier may be sequentially formed on the surface of a side, close to the backlight, of the first polarizer.

Further, the display device may further comprise a first transparent substrate disposed between the first polarizer and the backlight; and the parallax barrier may be formed on the surface of a side, close to the first polarizer, of the first transparent substrate.

Further, the first transparent electrode, the electroluminescent layer, and the second transparent electrode may be sequentially formed on the surface of a side, close to the backlight, of the first polarizer.

Further, the first transparent substrate may be fixedly coupled to the first polarizer.

Further, the display device may further comprise a second transparent substrate disposed between the first polarizer and the parallax barrier; and the first transparent electrode, the electroluminescent layer, and the second transparent electrode may be sequentially formed on the surface of a side, close to the parallax barrier, of the second transparent substrate.

Further, the second transparent substrate may be fixedly coupled to the first transparent substrate.

Further, the second transparent substrate may be fixedly coupled to the first polarizer.

Further, light emitted by the electroluminescent layer and light emitted by the backlight may have the same intensity and color.

Further, the parallax barrier may be disposed as attaching to the electroluminescent layer.

Further, the electroluminescent layer, when staying in the light-transmitting state, may have a transmittance over 92%.

Further, the opaque stripes of the parallax barrier may have a transmittance below 8%.

Further, a slit grating structure of the parallax barrier may comprise black-white stripes spaced apart.

Further, the black stripes may be manufactured by using black resins or black metals.

This disclosure also provides a method, which causes a display device comprising a display panel and a backlight switchable between a two-dimensional display mode and a three-dimensional display mode. The display panel comprises a first polarizer disposed on a side, close to the backlight, of the display panel; and a second polarizer disposed on a side, away from the backlight, of the display panel; wherein a parallax barrier is disposed between the first polarizer and the backlight; wherein a first transparent electrode, an electroluminescent layer, and a second transparent electrode are sequentially disposed between the first polarizer and the parallax barrier, the first transparent electrode and/or the second transparent electrode at least having a pattern corresponding to opaque stripes of the parallax barrier. The method comprises: configuring, in the two-dimensional display mode, the electroluminescent layer corresponding to the pattern to be in a luminescent state; and configuring, in the three-dimensional display mode, the electroluminescent layer corresponding to the pattern to be in a light-transmitting state.

This disclosure also provides an electronic product, which comprises the above one of display devices.

III. Beneficial Effects

In the display device switchable between the 2D display mode and the 3D display mode according to this disclosure, during 2D display, a voltage is applied such that the electroluminescent layer emits light for compensation of the slit light source, thus the slit light source becomes a surface light source for use in 2D display; during 3D display, the electroluminescent layer stays in the light-transmitting state, and switchover between the 2D display mode and the 3D display mode may be implemented by controlling whether or not to apply a voltage to the electroluminescent layer. The switchover between the 2D display mode and the 3D display mode may be implemented only by adding an electroluminescent layer, and the thickness of the display device is not increased to some extent. This facilitates manufacturing a light-weighted and thin display device, greatly reduces the manufacture cost, improves competitiveness in the market, and spurs promotion and application.

Figure 1:
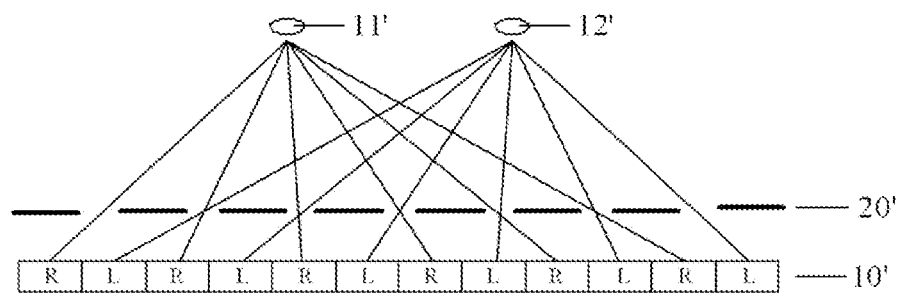
FIG. 1 is a schematic view of principles of glassless-type 3D display in the prior art.
Figure 2:
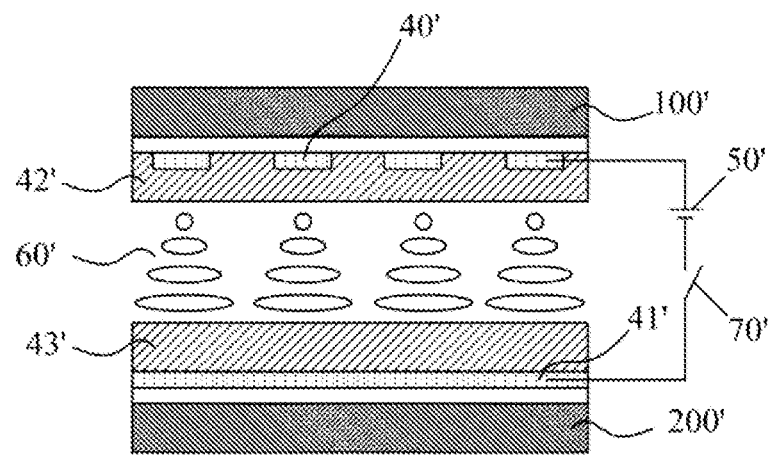
FIG. 2 is a schematic structural view of a liquid crystal shutter glasses-type parallax barrier in the prior art.

In FIGs:

10'—display panel; 11'—right eye; 12'—left eye; 40'—first transparent electrode; 41'—second transparent electrode; 42'—first liquid crystal alignment film; 42'—second liquid crystal alignment film; 50'—power supply; 60'—liquid crystal layer; 70'—switch; 100'—first substrate; 200'-second substrate; 20'—parallax barrier; 10—display panel; 20—parallax barrier; 30—second polarizer; 31—first polarizer; 50—backlight; 40—first transparent electrode; 401—first electrode bar; 41—electroluminescent layer; 42—second transparent electrode; 421—second electrode bar; 100—first substrate; 200—second substrate; 101—third substrate; 201—fourth substrate.

DETAILED DESCRIPTION

The present invention is further described with reference to the drawings and exemplary embodiments. The following embodiments are merely for illustrating the present invention, rather than limiting the scope of the present invention.

An embodiment of the present invention provides a display device switchable between a two-dimensional display mode and a three-dimensional display mode, comprising a display panel and a backlight, wherein a first polarizer disposed on a side, close to the backlight, of the display panel; and a second polarizer is disposed on a side, away from the backlight, of the display panel. To implement 3D display, a parallax barrier for use in glassless-type 3D display is disposed between the first polarizer and the backlight, and light emitted by the backlight passes through the parallax barrier and forms a slit light source for use in glassless-type 3D display. To implement 2D display, a first transparent electrode, an electroluminescent layer, and a second transparent electrode are sequentially disposed between the display panel and the parallax barrier, the first transparent electrode and/or the second transparent electrode at least having a pattern corresponding to opaque stripes of the parallax barrier, and the electroluminescent layer corresponding to the pattern switching between a luminescent state and a light-transmitting state. Specifically, during 2D display, the electroluminescent layer corresponding to the pattern stays in the luminescent state, for compensating for the slit light source such that the slit light source becomes a surface light source for use in 2D display; during 3D display, the electroluminescent layer corresponding to the pattern stays in the light-transmitting state.

Specifically, the first transparent electrode is at least formed by a plurality of first electrode bars parallelly disposed, wherein the first electrode bars are one-to-one corresponding to the opaque stripes of the parallax barrier in terms of position; and/or the second transparent electrode is at least formed by a plurality of second electrode bars parallelly disposed, wherein the second electrode bars are one-to-one corresponding to the opaque stripes of the parallax barrier in terms of position. When a voltage is applied between the first transparent electrode and the second transparent electrode, the electroluminescent layer corresponding to the electrode bar in terms of position emits light such that the slit light source formed by the light after passing through the parallax barrier becomes the surface light source under the compensation of the electroluminescent layer, and serves as the surface light source for use in 2D display. When no voltage is applied between the first transparent electrode and the second transparent electrode, the electroluminescent layer stays in the light-transmitting state such that the light emitted by the backlight forms the slit light source after passing through the parallax barrier, and serves as the slit light source for use in 3D display. Switchover between a 2D display mode and a 3D display mode may be implemented by controlling whether or not to apply a voltage between the first transparent electrode and the second transparent electrode.

When the electroluminescent layer stays in the light-transmitting state, to ensure the 3D display effect, the transmittance thereof needs to be over 80%, preferably over 92%.

The switchover between the 2D display mode and the 3D display mode may be implemented only by disposing the electroluminescent layer between the parallax barrier and the display panel, which does not increase the thickness of the display device, thereby facilitating light-weight and thinning of the display device switchable between a 2D display mode and a 3D display mode, greatly reducing the manufacturing cost, improving competitiveness in the market, and spurring promotion and application.

In this embodiment, preferably, light emitted by the electroluminescent layer and light emitted by the backlight have the same intensity and color, to serves as the surface light source for use in 2D display, and ensure the 2D display effect.

When the first transparent electrode and/or the second transparent electrode is (are) formed by electrode bars, to facilitate position alignment between the electrode bars and the parallax barrier, the parallax barrier may be disposed as attaching to the electroluminescent layer, to ensure the compensation effect of the electroluminescent layer to the slit light source.

Embodiment 1

Figure 3:
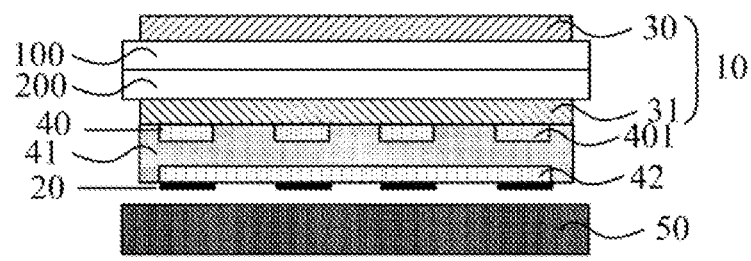
FIG. 3 is one schematic structural view of a display device according to Embodiment 1 of the present invention.

Referring to FIG. 3, this embodiment provides a display device switchable between a 2D display mode and a 3D display mode, comprising a display panel 10 and a backlight 50. The display panel 10 may comprise a first substrate 100 and a second substrate 200. A first polarizer 31 may be disposed on a side, close to the backlight 50, of the display panel 10; and a second polarizer 30 being disposed on a side, away from the backlight 50, of the display panel 10. To implement 3D display, a parallax barrier for use in glassless-type 3D display is disposed between the first polarizer 31 and the backlight 50, and light emitted by the backlight 50 passes through the parallax barrier 30 and forms a slit light source for use in 3D display. To implement 2D display, a first transparent electrode 40, an electroluminescent layer 41, and a second transparent electrode 42 are sequentially disposed between the first polarizer 31 and the parallax barrier 20, for compensating for the slit light source. And the slit source after the compensation changes to a surface light source for use in 2D display. Specifically, the first transparent electrode 40, the electroluminescent layer 41, the second transparent electrode 42, and the parallax barrier 20 are sequentially formed on the surface of a side, close to the backlight 50, of the first polarizer 31, and are fixedly coupled to the first polarizer 31, with the relative positions unchanged. In this way, 2D and 3D display effects may be better ensured, and alignment process during assembling is prevented, thereby facilitating the assembling process.

The slit grating structure of the parallax barrier 20 may be black-white stripes, wherein the black stripes (i.e., opaque stripes) may be manufactured by using black resins, metals, and the like materials, and the black stripes generally have a transmittance below 20%, and preferably below 8% to ensure the 3D display effect. The white stripes need to have a transmittance over 80%, and preferably over 92% to ensure the 3D display effect.

Figure 4:
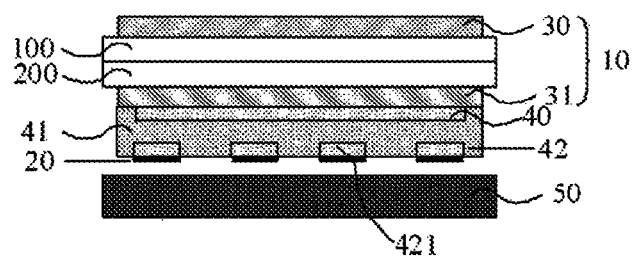
FIG. 4 is another schematic structural view of a display device according to Embodiment 1 of the present invention.
Figure 5:
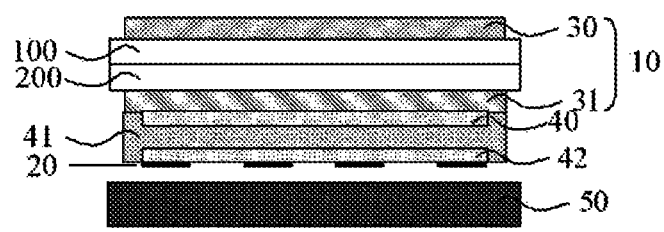
FIG. 5 is still another schematic structural view of a display device according to Embodiment 1 of the present invention.
Figure 6:
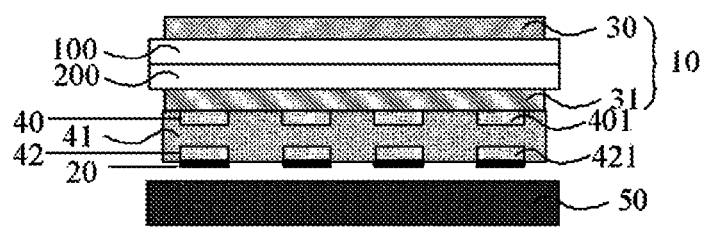
FIG. 6 is yet still another schematic structural view of a display device according to Embodiment 1 of the present invention.

In this embodiment, as illustrated in FIG. 3, the first transparent electrode 40 may comprise a plurality of first electrode bars 401 parallelly disposed, wherein the first electrode bars 401 are one-to-one corresponding to the opaque stripes of the parallax barrier 20 in terms of position; and the second transparent electrode 42 is an entire surface of electrodes. Nevertheless, it may also considered that: the second transparent electrode 42 comprises a plurality of second electrode bars 421 parallelly disposed, wherein the second electrode bars 421 are one-to-one corresponding to the opaque stripes of the parallax barrier 20 in terms of position, and the first transparent electrode 40 is an entire surface of electrodes, as illustrated in FIG. 4. Alternatively the first transparent electrode 40 and the second transparent electrode 42 are entire surfaces of electrodes, as illustrated in FIG. 5. In this case, to implement 2D display, only power needs to be applied to the first transparent electrode 40 and the second transparent electrode 42 such that the electroluminescent layer entirely emits light, with no need of causing the backlight to emit light. Alternatively the first transparent electrode 40 comprises a plurality of first electrode bars 401 parallelly disposed, wherein the first electrode bars 401 are one-to-one corresponding to the opaque stripes of the parallax barrier 20 in terms of position, and the second transparent electrode 42 also comprises a plurality of second electrode bars 421 parallelly disposed, wherein the second electrode bars 421 are one-to-one corresponding to the opaque stripes of the parallax barrier 20 in terms of position, as illustrated in FIG. 6.

Embodiment 2

Figure 7:
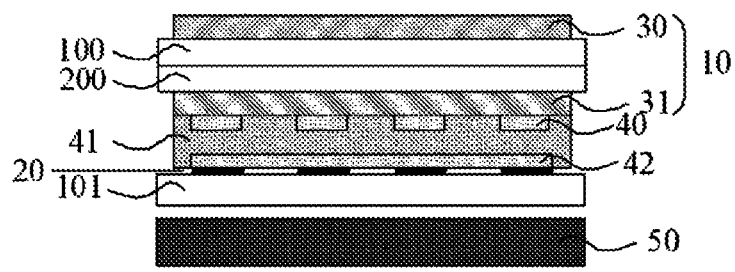
FIG. 7 is one schematic structural view of a display device according to Embodiment 2 of the present invention.

To provide a specific light mixing distance for the backlight 50, as illustrated in FIG. 7, the display device according to this embodiment further comprises a third transparent substrate (the first transparent substrate) 101 disposed between the first polarizer 31 and the backlight 50, wherein the third substrate 101 may be formed by a transparent substrate as a quartz substrate, a glass substrate, and an organic resin substrate. The parallax barrier 20 is formed on the surface of a side, close to the first polarizer 31, of the third substrate 101, as illustrated in FIG. 7, such that no spacer is needed between the backlight 50 and the parallax barrier 20 to provide a specific light mixing distance, thereby simplifying the manufacture process.

Correspondingly, the first transparent electrode 40, the electroluminescent layer 41, and the second transparent electrode 42 may be sequentially formed on the surface of a side, close to the backlight 50, of the first polarizer 31, as illustrated in FIG. 4. The third substrate 101 is fixedly coupled to the first polarizer 31. To be specific, the third substrate 101 may be fixed to the first polarizer 31 via a gum frame, such that the electroluminescent layer 41 and the parallax barrier 20 are both fixed to the first polarizer 31. This ensures that the relative positions thereof do not change, and therefore the 2D and 3D display effects are ensured.

Figure 8:
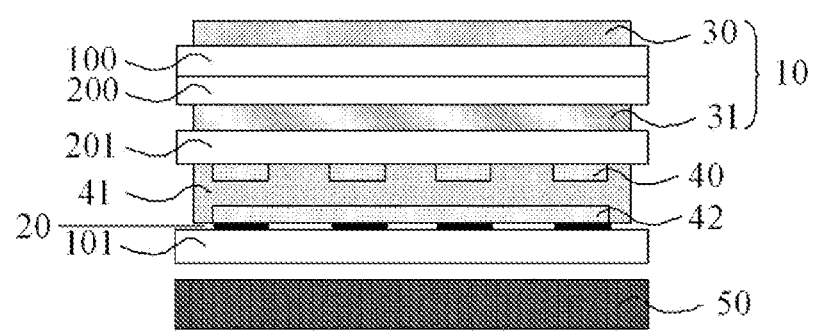
FIG. 8 is another schematic structural view of a display device according to Embodiment 2 of the present invention.

In this embodiment, as illustrated in FIG. 8, a fourth substrate (the second transparent substrate) 201 may be disposed between the first polarizer 31 and the parallax barrier 20, wherein the fourth substrate 201 may be formed by a transparent substrate as a quartz substrate, a glass substrate, and an organic resin substrate. The first transparent electrode 40, the electroluminescent layer 41, and the second transparent electrode 42 are sequentially formed on the surface of a side, close to the parallax barrier 20, of the fourth substrate 201. During 2D display, a specific light mixing distance may be provided for the surface light source obtained by compensation from the electroluminescent layer 41, thereby improving the 2D display effect.

When the first transparent electrode 40 and/or the second transparent electrode 41 is (are) formed by electrode bars, preferably, the fourth substrate 201 is fixedly coupled to the third substrate 101. To be specific, the fourth substrate 201 is fixed to the third substrate 101 via a gun frame, such that the relative positions of the electrode bars and the opaque stripes of the parallax barrier 20 do not change. This ensures the compensation effect of the electroluminescent lay 41 to the slit light source, and obtaining an even surface light source. Further, the fourth substrate 201 may be fixedly coupled to the first polarizer 31, such that the electroluminescent layer 41 and the parallax barrier 20 are both fixed to the display panel 10. This ensures the relative positions thereof do not change, and therefore the 2D and 3D display effects are ensured.

It can be seen from the above embodiments that, in the display device switchable between the 2D display mode and the 3D display mode, a parallax barrier is displayed between the display panel and the backlight, for providing a slit light source for use in 3D display, thereby implementing 3D display. An electroluminescent layer is disposed between the display panel and the parallax barrier, wherein a part of the electroluminescent layer, at least corresponding to the opaque stripes of the parallax barrier, may switch between a luminescent state and a light-transmitting state. During 2D display, a voltage is applied such that the electroluminescent layer emits light for compensation of the slit light source and thus the slit light source becomes a surface light source for use in 2D display. During 3D display, the electroluminescent layer stays in the light-transmitting state. Switchover between the 2D display mode and the 3D display mode may be implemented by controlling whether or not to apply a voltage to the electroluminescent layer. The switchover between the 2D display mode and the 3D display mode may be implemented only by adding an electroluminescent layer, and the thickness of the display device is not increased. This facilitates light-weight and thinning of the display device, greatly reduces the manufacture cost, improves competitiveness in the market, and spurs promotion and application.

Described above are preferred embodiments of the present invention. It should be noted that persons of ordinary skill in the art may derive other improvements or replacements without departing from the principles of the present invention. Such improvements and replacements shall be deemed as falling within the protection scope of the present invention.

What is claimed is:

1. A display device, which is switchable between a two-dimensional display mode and a three-dimensional display mode, comprising a display panel and a backlight, wherein the display panel comprises a first polarizer disposed on a side, close to the backlight, of the display panel; and a second polarizer disposed on a side, away from the backlight, of the display panel; wherein a parallax barrier is disposed between the first polarizer and the backlight;

wherein a first transparent electrode, an electroluminescent layer, and a second transparent electrode are sequentially disposed between the first polarizer and the parallax barrier, the first transparent electrode and/or the second transparent electrode at least having a pattern corresponding to opaque stripes of the parallax barrier; and wherein, in the two-dimensional display mode, the electroluminescent layer corresponding to the pattern stays in a luminescent state; and in the three-dimensional display mode, the electroluminescent layer corresponding to the pattern stays in a light-transmitting state.

2. The display device according to claim 1, wherein the first transparent electrode, the electroluminescent layer, the second transparent electrode, and the parallax barrier are sequentially formed on the surface of a side, close to the backlight, of the first polarizer.

3. The display device according to claim 1, further comprising a first transparent substrate disposed between the first polarizer and the backlight; and wherein the parallax barrier is formed on the surface of a side, close to the first polarizer, of the first transparent substrate.

4. The display device according to claim 3, wherein the first transparent electrode, the electroluminescent layer, and the second transparent electrode are sequentially formed on the surface of a side, close to the backlight, of the first polarizer.

5. The display device according to claim 4, wherein the first transparent substrate is fixedly coupled to the first polarizer.

6. The display device according to claim 3, further comprising a second transparent substrate disposed between the first polarizer and the parallax barrier; and wherein the first transparent electrode, the electroluminescent layer, and the second transparent electrode are sequentially formed on the surface of a side, close to the parallax barrier, of the second transparent substrate.

7. The display device according to claim 6, wherein the second transparent substrate is fixedly coupled to the first transparent substrate.

8. The display device according to claim 6, wherein the second transparent substrate is fixedly coupled to the first polarizer.

9. The display device according to claim 1, wherein light emitted by the electroluminescent layer and light emitted by the backlight have the same intensity and color.

10. The display device according to claim 1, wherein the parallax barrier is disposed as attaching to the electroluminescent layer.

11. The display device according to claim 1, wherein the electroluminescent layer, when staying in the light-transmitting state, has a transmittance over 92%.

12. The display device according to claim 1, wherein the opaque stripes of the parallax barrier have a transmittance below 8%.

13. The display device according to claim 1, wherein a slit grating structure of the parallax barrier comprises black-white stripes spaced apart.

14. The display device according to claim 13, wherein the black stripes are manufactured by using black resins or black metals.

15. A method, which causes a display device comprising a display panel and a backlight switchable between a two-dimensional display mode and a three-dimensional display mode, wherein the display panel comprises a first polarizer disposed on a side, close to the backlight, of the display panel; and a second polarizer disposed on a side, away from the backlight, of the display panel; wherein a parallax barrier is disposed between the first polarizer and the backlight;

wherein a first transparent electrode, an electroluminescent layer, and a second transparent electrode are sequentially disposed between the first polarizer and the parallax barrier, the first transparent electrode and/or the second transparent electrode at least having a pattern corresponding to opaque stripes of the parallax barrier; and the method comprising:

configuring, in the two-dimensional display mode, the electroluminescent layer corresponding to the pattern to be in a luminescent state; and configuring, in the three-dimensional display mode, the electroluminescent layer corresponding to the pattern to be in a light-transmitting state.

16. An electronic product, comprising a display device which is switchable between a two-dimensional display mode and a three-dimensional display mode, wherein the display device comprises a display panel and a backlight, and wherein the display panel comprises a first polarizer disposed on a side, close to the backlight, of the display panel; and a second polarizer disposed on a side, away from the backlight, of the display panel; wherein a parallax barrier is disposed between the first polarizer and the backlight;

wherein a first transparent electrode, an electroluminescent layer, and a second transparent electrode are sequentially disposed between the first polarizer and the parallax barrier, the first transparent electrode and/or the second transparent electrode at least having a pattern corresponding to opaque stripes of the parallax barrier; and wherein, in the two-dimensional display mode, the electroluminescent layer corresponding to the pattern stays in a luminescent state; and in the three-dimensional display mode, the electroluminescent layer corresponding to the pattern stays in a light-transmitting state.

17. The electronic product according to claim 16, wherein the first transparent electrode, the electroluminescent layer, the second transparent electrode, and the parallax barrier are sequentially formed on the surface of a side, close to the backlight, of the first polarizer.

18. The electronic product according to claim 16, further comprising a first transparent substrate disposed between the first polarizer and the backlight; and wherein the parallax barrier is formed on the surface of a side, close to the first polarizer, of the first transparent substrate.

19. The electronic product according to claim 18, wherein the first transparent electrode, the electroluminescent layer, and the second transparent electrode are sequentially formed on the surface of a side, close to the backlight, of the first polarizer.

20. The electronic product according to claim 19, wherein the first transparent substrate is fixedly coupled to the first polarizer.

\* \* \* \* \*